April 14, 1931.    F. HODGKINSON    1,800,941
LUBRICATING SYSTEM
Filed May 22, 1925    4 Sheets-Sheet 1

Fig. 1.

WITNESS

F. Hodgkinson
INVENTOR

BY
ATTORNEY

Fig. 2.

April 14, 1931. F. HODGKINSON 1,800,941
LUBRICATING SYSTEM
Filed May 22, 1925 4 Sheets-Sheet 3

Fig.3.

F. Hodgkinson
INVENTOR

Fig.4.

Patented Apr. 14, 1931

1,800,941

UNITED STATES PATENT OFFICE

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA

LUBRICATING SYSTEM

Application filed May 22, 1925. Serial No. 32,152.

My invention relates to lubricating systems, particularly to pressure lubricating systems for prime movers and the like and it has for an object to provide a system of the character designated which shall be capable of maintaining a continuous supply of lubricant at the required pressure for any desired period of time. It has for a further object to include in such a system dual pumping apparatus together with means for coordinating the movements of the two pumps whereby any tendency for the lubricant pressure to fluctuate is entirely avoided.

These and other objects, which will be made apparent throughout the further description of my invention, are attained by the employment of the apparatus hereinafter described and illustrated in the accompanying drawings in which:

The present invention contemplates a pressure lubricating system for such power developing units as steam turbines in which the lubricant, hereinafter for convenience termed oil, is normally supplied by means of a pump and in which an auxiliary pump is provided for compensating for any deficiencies which may occur in the amount of oil delivered by the first or main pump. It is of considerable advantage to embody in such a system an automatic control mechanism for coordinating the movements of the two pumps.

One form of such a system, which has been found to be especially effective, is disclosed in a co-pending application of Josiah F. Johnson, Serial No. 490,749, filed August 8, 1921, now Patent No. 1,647,135, granted Nov. 1, 1927, entitled Fluid pressure control and assigned to the Westinghouse Elec. & Mfg. Co. In the Johnson system, the main oil pump, which is generally driven by the turbine, discharges, under normal conditions of operation, a quantity of oil in excess of the turbine requirements, the excess oil overflowing to the source of supply. A regulating device is provided for controlling the amount of overflow and for actuating the motive fluid admission valve of the auxiliary pump in accordance therewith, the auxiliary pump being driven by steam power rather than by an electrical motor for the reason that steam must be available in order for the turbine to operate, while the electrical circuits may be in disorder even though the turbine be operating. The regulating device is so arranged that, upon the overflow of oil first ceasing and then the delivery pressure falling, the steam admission valve of the auxiliary pump is opened in order that the required amount of oil may be constantly supplied to the system.

In power plants wherein the prevailing steam pressure is less than, for example 300 pounds, the regulating device is ordinarily capable of acting directly upon the steam admission valve of the auxiliary oil pump, which valve may, for these pressures, be of any well-known type. In numerous recently constructed power plants, however, steam pressures as high as 1200 pounds are contemplated and pressures of 600 pounds are being frequently employed. At such operating pressures, I have found it very advisable to employ a single ported valve of a type which may be easily repaired or reground or cheaply replaced rather than any of the well known forms of comparatively complicated multi-ported balanced valves.

I have, therefore, further developed the regulating device illustrated in the Johnson application by embodying in such a control device a fluid relay whereby a valve of the single ported type may be held upon its seat with such a preponderance of pressure as to entirely preclude leakage of the fluid. Furthermore, I have so arranged the regulating device that its movements are responsive to the changes in the working pressure of the relatively low pressure oil which is delivered to the bearings, while the relay itself is actuated by the relatively high pressure oil generally supplied to the various relays ordinarily associated with the main admission valves of the tribune. I have so arranged my lubricating system that but a single pumping system is required for supplying the relatively high pressure oil to the relays as well as the relatively low pressure oil to the bearings, and in addition the necessary oil required to operate the auxiliary pump regulator. While I have described my regulating device as being especially adapted for use in lubricating systems, it is to be understood that it may be applied in a general way for reducing or regulating the pressure of any fluid.

Figure 2:
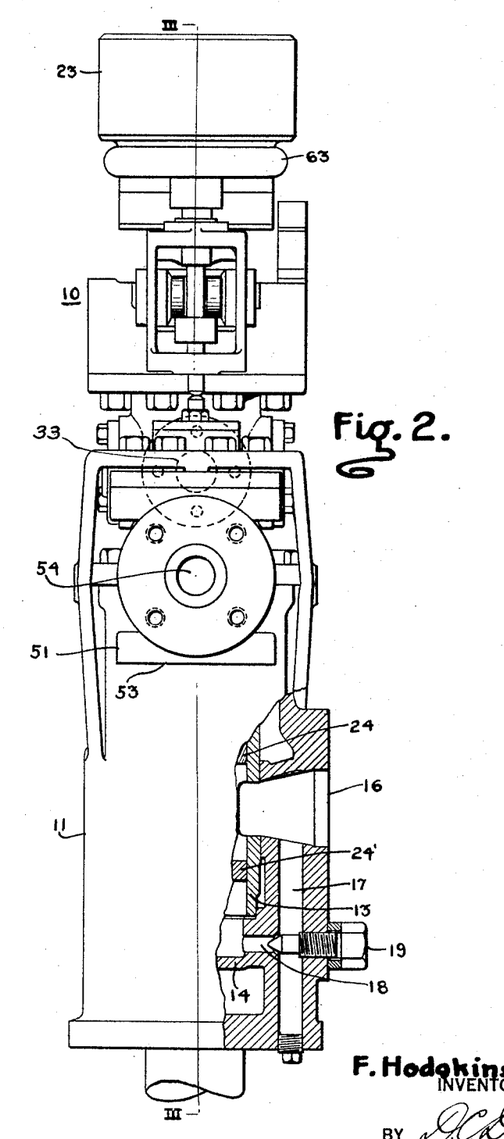
Fig. 2 is a view, partly in section and partly in elevation, of the auxiliary lubricating pump regulator employed in Fig. 1.
Figure 3:
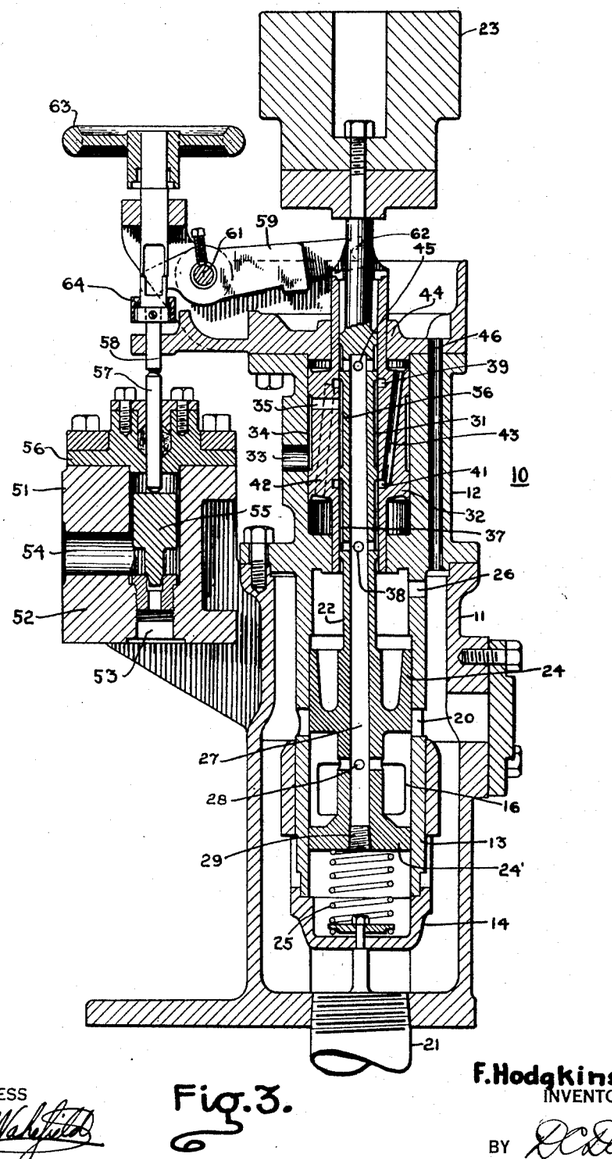
Fig. 3 is a sectional view taken on the line III—III of Fig. 2

Referring to the drawings for a more detailed description of my invention, I show in Figs. 2 and 3 one form of my auxiliary pump regulator 10. The regulator 10 is provided with a casing 11 having super-imposed thereon a relay cylinder 12. Depending from the relay cylinder 12 is an actuating cylinder 13, the lower end of which makes a fluid-tight joint with a cylinder head 14 carried in the casing 11. Provided in the casing 11 is a low pressure oil inlet 16 which communicates directly with the interior of the actuating cylinder. Connecting the low pressure oil inlet 16 and the cylinder head 14 are passages 17 and 18 having disposed therein an adjustable needle valve 19 for damping pulsations in the pressure of the oil. Oil outlets or over-flow ports 20 are provided in the actuating cylinder and an over-flow connection 21 is provided in the lower portion of the regulator casing 11.

Disposed within the actuating cylinder 13 is a piston rod 22 which extends upwardly through the relay cylinder and is provided at its upper end with a suitable weight 23. The lower end of the piston rod 22 is provided with upper and lower pistons 24 and 24′ arranged within the actuating cylinder 13. A suitable compression spring 25 is interposed between the cylinder head 14 and the lower piston 24′. The purpose of the spring 25, which is preferably adjusted to be in engagement only when there is no overflow, is to give scale and insure stability to the regulating system, the oil pressures being slightly lower for large than for small steam flow in accordance with the scale of the spring. The relative locations of the upper piston 24 and of the over-flow ports 20 are so arranged that, with no over-flow, the piston 24 slightly laps the ports 20. A suitable leak-off connection 26 is provided in the upper end of the actuating cylinder 13 for discharging any oil which may accumulate above the piston 24 and for maintaining atmospheric pressure therein. The piston rod 22 is provided with a hollow portion 27 for draining oil discharged from the relay cylinder to the overflow connection 21. Radially disposed ports 28 are therefore provided in the piston rod between the upper and lower pistons while the lower end of the hollow passage 27 is closed as by a plug 29.

The upper end of the piston rod 22 is utilized as a pilot valve 31 for a relay piston 32 which is disposed in the cylinder 12. The cylinder 12 is provided with a high pressure oil inlet 33 which communicates with an annular recess 34 provided in the outer periphery of the piston 32 which recess, in turn, connects with radially disposed ports 35 also provided in the piston. The ports 35 are arranged to communicate with a supply annulus 36 provided in the pilot valve 31. Disposed below the supply annulus 36 is an annulus 37 for the discharge of oil to the over-flow 21 through radial holes 38. Provided in the inner circumference of the piston 32 are upper and lower circular passages 39 and 41, the upper passage 39 communicating through a duct 42 with the lower end of the relay cylinder 12 and the lower passage 41 communicating through a duct 43 with the upper end of the cylinder. A suitable head 44 is provided for the upper end of the cylinder. Oil discharged from the lower end of the cylinder is relieved to the over-flow connection 21 by radial holes 45 provided in the piston rod, while oil which may accumulate on the upper portion of the cylinder head 44 is drained to the overflow by means of a passage 46.

The steam admission valve of the auxiliary oil pump is represented at 51. This valve is provided with a body 52 and a steam inlet 53 and an outlet 54. Interposed between the inlet and the outlet is a valve 55 which is preferably of the single ported type and which is freely movable in the valve body. The valve is provided with a readily removable bonnet 56 and a stem 57 disposed in abutting relation with the valve 55. The arrangement of the valve body 52 is such that the removal of the bonnet 56 permits excellent access for regrinding purposes. The stem 57 is actuated through a push rod 58 by a lever 59 which is fulcrumed at 61 and pivotally connected to the relay piston 32 at 62. Suitable mechanism, operated through a hand wheel 63, is provided for disengaging the regulator from the valve whereby the valve may be manually operated independently of the regulator. It is noted that the inlet and outlet connections are so arranged in the valve body that the steam pressure acts to move the valve from its seat. Suitable liners 64 are provided in the valve lever actuating mechanism in order to provide some adjustments between the valve stem 57 and the actuating piston 32 so that the relation between the point of overflow and the time of steam valve opening may be adjusted as desired.

Figure 1:
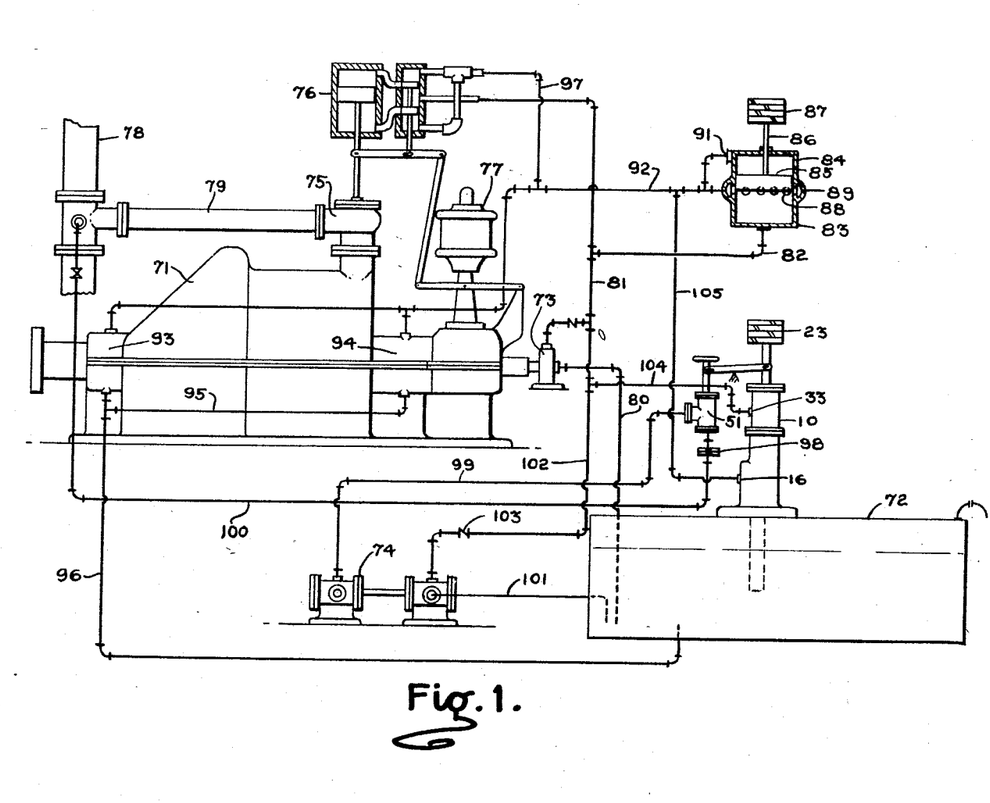
Fig. 1 is a diagrammatic arrangement of one form of lubricating system arranged in accordance with my invention.

In Fig. 1, I show the above described auxiliary pump regulator 10 in connection with a steam turbine 71 and a lubricating oil reservoir 72. The regulator may be mounted upon the oil reservoir so that oil passing through the overflow connection 21 of the regulator drains directly into the reservoir. The turbine 71 is provided with a main lubricating pump 73, which is preferably driven from the main shaft of the turbine, and an auxiliary lubricating pump 74, which is preferably steam driven independently of the turbine. While I have shown the main lubricating pump 73 as being directly connected to the turbine, it is obvious that this pump may also be driven from an independent source. The turbine 71 is also provided with a motive fluid admission valve 75 which is actuated through any well known form of fluid relay mechanism, such as 76, by a governor mechanism 77. Steam is conveyed to the admission valve 75 by conduits 78 and 79.

The main lubricating pump 73 withdraws oil from the reservoir 72 through a conduit 80 and discharges it through a conduit 81 to the relay mechanism 76 to be employed therein as actuating fluid for opening and closing the admission valve 75. The conduit 81 is provided with a branch conduit 82 which communicates with an accumulator 83. This accumulator is provided for insuring an adequate supply of oil to the various fluid relay mechanisms to cause them to act quickly and positively. The idea of providing such an accumulator in a lubricating oil system was first disclosed in a co-pending application of mine serially numbered 758,404, filed December 27, 1924, now Patent No. 1,613,753 issued January 11, 1927, entitled Hydraulic regulating device and assigned to the Westinghouse Electric & Manufacturing Company. As shown in my patent application, this accumulator may assume various mechanical expressions. In the present application, I have shown one form which consists of a cylinder 84 having disposed therein a piston 85 provided with a rod 86 which carries a weight 87. Provided about the periphery and spaced from the lower end of the cylinder 83, are a plurality of outlet holes 88 communicating with a discharge manifold 89. A connection 91 is provided in the upper end of the cylinder for discharging or admitting oil above the piston. The volumetric capacity of the cylinder 84 below the outlet holes 88 is sufficient to supply the oil demanded momentarily by the various fluid relays when in motion, the pump 73 being usually of such capacity as to be incapable of supplying the amount of oil at the rate required for desirable quick motion of the relays. The oil discharged from the manifold 89 is conveyed by a conduit 92 to bearings 93 and 94 provided in the turbine 71 and to any other bearings that may be associated with various apparatus in the power plant, such as the bearings of the electrical generators, etc. Oil is drained from the bearings 93 and 94 by conduits 95 and 96 to the oil reservoir 72. The oil discharged from the relay mechanism 76 is conveyed by a conduit 97 to the low pressure supply line 92.

The valve 51, embodied in the regulator 10, controls the admission of steam to the auxiliary lubricating oil pump 74. It is supplied with steam by a conduit 100 which connects with the main supply conduit 78. If desired, a suitable orifice 98 may be provided in the steam line 100 for somewhat reducing the pressure of the steam prior to its entrance into the valve 51. It is to be noted, however, that this reduction in pressure occurs only when steam is flowing through the valve, and that when the valve 51 is closed it is required to seal against the full pressure prevailing in the main supply conduit 78. A conduit 99 connects the outlet of the valve 51 with the steam cylinder of the auxiliary pump 74. The oil cylinder of the pump is provided with a suction conduit 101 connecting with the reservoir 72 and a discharge conduit 102 which connects with the discharge conduit 81 of the main lubricating pump 73, thus forming a common discharge conduit for both the main and auxiliary lubricating oil pumps. High pressure oil is supplied to the connection 33 of the regulator by a conduit 104 which connects with the high pressure discharge conduits 81 and 102, while the pressure of the oil supplied to the bearings communicates with the actuating inlet connection 16 through a conduit 105.

The operation of the above embodiment of my invention is as follows:—

Assuming the turbine 71 to be operating at a normal speed, the main lubricating pump 73 delivers a predetermined quantity of oil which is somewhat in excess of the turbine requirements at a pressure of, for example, 60 pounds to the conduits 81 and 102. These conduits communicate with the relay mechanism 76 for supplying actuating fluid thereto at the full pressure developed by the pump. The conduits 81 and 102 also communicate with the accumulator 83 for supplying oil thereto, sufficient oil having accumulated therein to retain the piston 85 in approximately the position illustrated. With the piston normally in this position, oil flows through the outlet holes 88 and the discharge manifold 89 to the conduit 92 at a relatively low pressure as determined by the quantity of oil delivered by the pump as well as the resistance to flow encountered by the oil in its passage through the bearings, piping, etc. The accumulator functions in the manner of a relief valve, maintaining the desired pressure on the governor system in accordance with the weight of the accumulator. The low pressure oil relieved from the accumulator is conveyed to the bearings 93 and 94, after which it returns to the reservoir 72.

The speed of the turbine 71 is maintained approximately constant by means of the governor mechanism 77 which, upon any tendency of the turbine to assume a different operating speed, acts to move the fluid in a manner well understood in the art. The moving of the fluid relay creates a sudden demand upon the pump 73 for a substantial quantity of fluid in addition to the bearing requirements. While the capacity of the pump 73 is sufficiently in excess of turbine requirements as to be capable of supplying this added fluid in relatively short time, nevertheless, in order that the movements of the relay mechanism may be even more rapid, I have provided the accumulator 83 which contains sufficient liquid below the piston to instantly supply the various relay mechanisms embodied in the lubricating system. Therefore, upon a sudden increase in demand resulting from the movements of the relay, the piston 85 moves downwardly and momentarily supplements the pumping capacity of the system. At such times, oil at the high pressure, which has been given at 60 lbs., is conveyed through the conduit 82 to the conduit 81 and joins with the fluid discharged by the pump from whence it is conveyed to the relay mechanism 76. It is obvious that any movement of the relay mechanism necessarily requires a displacement of an equal amount of oil contained therein and, inasmuch as the downward movement of the piston 85 may close the outlet holes 88 in the accumulator, the fluid displaced in the relay mechanism is conveyed by the conduit 97 to the conduit 92. A portion of this liquid may be utilized in the bearings 93 and 94 and the remaining portion is admitted to the upper end of the accumulator through the nozzle 91 so that the flow to the bearings is at all times approximately constant and equal to the amount discharged by the pump. It is noted that such a form of lubricating system provides a constant supply of lubricant to the bearings in proportion to the speed of the pump during movement of the relay mechanism and regardless of whether the accumulator is being charged or discharged.

The capacity of the main lubricating pump 73 is such, that under normal operating conditions, it discharges an amount of oil in excess of the turbine lubricating system requirements. This excess fluid is conveyed by the conduit 105 to the auxiliary pump regulator 10 at the reduced pressure determined by the weight 23 of the regulator. The excess liquid enters the actuating fluid inlet 16 and normally passes between the upper and lower pistons 24 and 24' to the port 20 from whence it drains downwardly through the casing 11 to the overflow connection 21 and finally to the reservoir 72. The pressure of the lubricant entering the inlet 16 is conveyed by the passages 17 and 18 to the actuating cylinder 13 and acts upon the lower face of the lower piston 24'. The pressure of the fluid opposes the thrust exerted by the weight 23. The size of the weight 23 is such that the pressure of the oil, which may be five pounds, normally holds the piston rod in the position illustrated with respect to the actuating cylinder 13. Increases or decreases in the pressure of the oil result in an upward or downward movement of the piston rod 22 in response thereto, thus regulating the amount of oil passing to the overflow connection through the ports 20. In order to prevent harmonic motion of the mechanism termed "hunting," I have provided the needle valve 19 for restricting the passages 17 and 18, whereby pulsations in fluid pressures are damped and are consequently not transmitted to the actuating piston.

The full pressure of the lubricant discharged by the pump 73 is conveyed by a conduit 104 to the high pressure inlet 33 of the regulator. Under normal conditions of operation, this fluid pressure is transmitted through the annular recess 34, the radially disposed ports 35, the supply annulus 36, the circular passage 39 and the duct 42 to the lower end of the cylinder 12. This pressure acts upon the lower face of the piston 32, exerting a thrust in an upward direction, which thrust is transmitted through the lever 59 and the push rod 58 to the valve stem 57 for holding the valve 55 against its seat. Steam is conveyed to the inlet 53 of the valve by means of the conduit 100. The pressure of the steam in the conduit 100 during periods of inactivity of the auxiliary oil pump 74, is substantially that of the steam supplied to the admission valve 75 of the turbine, which very high steam pressure acts to move the valve 55 from its seat. My regulator is so arranged, however, that I may construct the bore of the relay cylinder and the diameter of the relay piston of such dimensions that the discharge pressure of the main lubricating pump is sufficient for holding the valve 55 firmly upon its seat.

In the operation of a turbine, it frequently happens that the quantity of oil discharged by the main lubricating oil pump varies somewhat from the designed operating pressure. Such a condition prevails during the starting and stopping periods of the machine or may be caused by obstructions in the piping or changes in the viscosity of the oil due to changes in its temperature or because of injury to the main pump, or for numerous other reasons. As the main pump delivers an amount of oil in excess of the turbine requirements, normal fluctuations in the velocity of flow are compensated for by the regulator 10 controlling the amount of oil overflowing to the reservoir through the outlet 21. However, upon an abnormal decrease in flow and a consequent drop in pressure taking place in the conduit 105, the accumulator 83 maintains the pressure in 81 constant within its and the pump's capacities. Under such conditions, the weight 23 of the regulator moves the actuating piston rod 22 downwardly, thus closing the port 20 and completely stopping the overflow of oil through the outlet 21 to the reservoir.

Further downward movement of the piston rod 22 brings the piston 24 into engagement with the spring 25. Such movement also places the circular passage 41 of the relay piston in communication with the supply annulus 36 and the high pressure fluid is transmitted through the duct 43 to the upper end of the relay cylinder. The pressure acting upon the upper face of the piston 32 moves it downwardly, thus removing the push rod 58 from the valve stem 57 and permitting the steam pressure to move the valve 55 from its seat. Thereafter steam is conveyed to the auxiliary oil pump 74 which pumps oil through the suction conduit 101 from the reservoir 72 and discharges the same at the required quantity to supply the lubricating system at the pressure determined by the regulator 10. Upon downward movement of the relay piston 32, the oil contained in the lower end of the cylinder 12 is discharged through the duct 42 to the radially disposed ports 45, and thence into the hollow interior of the piston rod 22 from whence it is conveyed through the ports 28 and 20 to the overflow connection 21.

It is noted that while normally the steam valve 51 is held upon its seat with a preponderance of force, nevertheless my regulator is so designed that it is extremely sensitive to the slightest changes in pressure. Furthermore my regulator is constructed without the aid of packing glands of any kind so that its movements are free and unrestricted.

While I have described the accumulator as being adapted for momentarily supplying the greater portion of the oil required by the relay mechanism 76, nevertheless this accumulator may be designed so as to accommodate the relay mechanism associated with the regulator 10 and also any other relay mechanisms which may be required for any other purposes in connection with the turbine.

Figure 4:
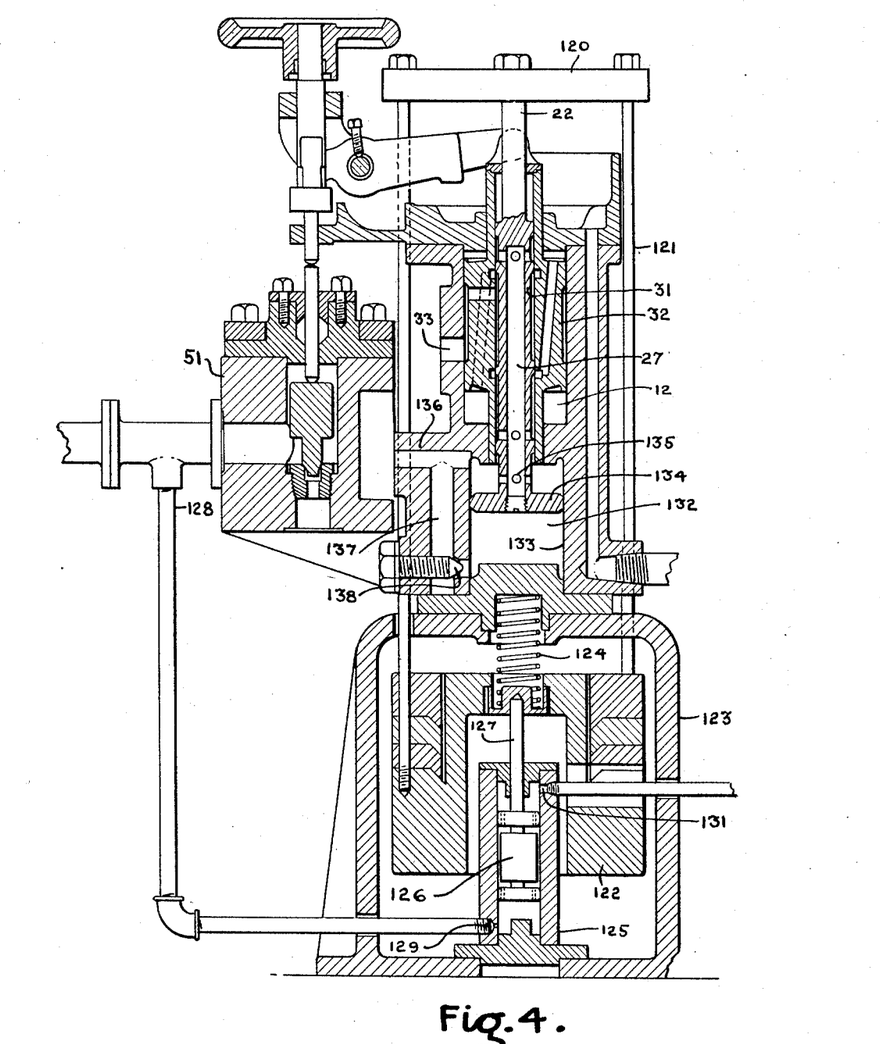
Fig. 4 is a sectional view of another form of regulator which I have devised.

In Fig. 4 I show another embodiment of my regulator 10 which is adapted to be employed not only in a lubricating system such as is illustrated in Fig. 1, but which may be employed generally in power plant installations to effect a uniform reduction of very high steam pressures. In this embodiment, the valve 51 is operatively connected to the relay piston 32 of the relay cylinder 12 in a manner similar to that which has been shown and described in relation to Figs. 2 and 3. Any relatively high pressure fluid, such as oil or water, may be supplied to the inlet 33 of the relay cylinder for actuating the relay piston. In this embodiment the upper end of the piston rod 22 is provided with a yoke 120 from which is suspended, by means of rods 121, a suitable weight 122. Interposed between the weight 122 and a base 123 for supporting the regulator is a spring 124 which is preferably of a very light scale and, therefore, extremely sensitive to changes in pressure. Associated with the weight is an actuating cylinder 125 having disposed therein a piston 126 which engages, through a rod 127, the weight 122. The pressure of the steam on the discharge side of the valve 51 is conveyed by means of a conduit 128 to an inlet connection 129 provided in the lower end of the cylinder 125. The pressure thus admitted acts upon the lower face of the piston 126 to lift the weight 122 against the force exerted by the spring 124, thereby actuating the pilot valve 31 through the rods 121 and yoke 120.

The regulator is so arranged that, upon any tendency for the pressure to increase in the conduit 128, the piston 126 moves the pilot valve 31 to cause the relay piston 32 to move the valve 51 toward a closing position. On the other hand, upon any tendency for the pressure in the conduit 128 to decrease, the spring 124 and the weight 122 move the piston 126 downwardly thereby causing the pilot valve 31 to further open the valve 51. A suitable leak-off connection 131 is provided in the upper end of the actuating cylinder 125 for preventing the accumulation of excess pressure in the upper end of the cylinder, or in other words, for maintaining atmospheric pressure therein.

With this form of regulator, I may provide a dashpot mechanism 132 for cushioning the movements of the piston rod 22 and its connected parts. As shown, the dashpot comprises a cylinder 133 having disposed therein a piston 134 which is attached to the piston rod 22. Oil discharged from the relay cylinder 12 drains downwardly through the hollow interior 27 of the piston rod and enters the cylinder 133 of the dashpot mechanism through radially disposed holes 135. This oil is freely discharged from the cylinder 133 through an outlet 136. A portion of the oil which is discharged from the relay cylinder drains downwardly between the annular working clearance provided between the piston 134 and the walls of the cylinder and accumulates in the lower portion of the dashpot mechanism. Upon any tendency for the pressure to decrease in the conduit 128, the downward movement of the piston 134 displaces the oil, which has leaked into the lower end of the cylinder, through a passage 137 to the outlet 136. In order that the downward movement of the piston 134 and its connected mechanism may be effectively damped, I have provided in the passage 137 some suitable means for restricting the flow, such as an adjustable needle valve 138. With such an arrangement the flow of oil through the passage 137 is so regulated that the downward movement of the piston rod 22 and its connected mechanism is smooth and gradual.

While I have described the use of oil for actuating the relay piston 32, nevertheless it is to be understood that it is within the purview of my invention to employ any suitable liquid having the required pressure. The regulator is so arranged that the movements of the valve 51 are very accurately controlled and the steam pressure consequently confined within very close limits by providing the weight 122 for withstanding the base load exerted by the thrust of the piston 126 and a spring 124 of relatively light scale for controlling the movements of the regulator in response to variations from the base pressure. Of prime importance, however, is the fact that I have provided means for so actuating a single disc valve, that it is capable of operating effectively against very high steam pressures, for example, 600 to 1200 pounds per square inch. My mechanism for regulating the movements of this valve is so arranged that the desired pressure on the discharge side of the valve is very accurately maintained irrespective of variations in the pressure on the admission side of the valve.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a lubricating system for a machine, the combination of a distributing conduit, a main pump connected to the conduit for discharging lubricant at a relatively high pressure, the amount of lubricant discharged by the pump being normally in excess of the requirements, means for conveying a quantity of the lubricant discharged by the pump at a relatively lower pressure to the machine, a device responsive to the pressure of the relatively low pressure lubricant for controlling the overflow of excess lubricant from the system, an auxiliary pump for supplementing the pumping capacity of the main pump, a motive fluid admission valve for the auxiliary pump, and a fluid relay mechanism responsive to the movements of the pressure-responsive device controlling the overflow of excess lubricant for actuating the motive fluid admission valve, said relay mechanism being actuated by the relatively high pressure lubricant discharged by the pumps.

2. In a lubricating system, the combination of lubricating oil pumps for normally supplying the system with lubricant at a relatively high pressure, a motive fluid admission valve for one of the pumps, means for distributing some of the lubricant at a relatively lower pressure, a servo-motor connected to the high pressure fluid for actuating the admission valve, and a device responsive to the pressure of the low pressure fluid for controlling the movements of the servo-motor.

3. In a lubricating system, the combination of lubricating oil pumps for normally supplying the system with a quantity of lubricant in excess of the requirements and at a relatively high pressure, means for distributing some of the lubricant at a relatively lower pressure, a motive fluid admission valve for one of the pumps, a servo-motor connected to the high pressure fluid for actuating the admission valve, and a device responsive to the pressure of the low pressure fluid for controlling the overflow of excess fluid from the system and for controlling the movements of the servo-motor.

4. A lubricating system as claimed in claim 3 including the provision of means for disengaging the servo-motor from the admission valve.

5. In a lubricating system, the combination of means for supplying a quantity of lubricant to the system which is normally in excess of the requirements, an actuating cylinder, means for conveying the pressure of the lubricant in the system to the actuating cylinder, a piston movable in response to the pressure of the lubricant in the cylinder for controlling the overflow of excess lubricant from the system, and means provided in said conveying means for damping fluctuations in the pressure of the fluid acting upon the piston.

6. In a lubricating system, the combination of a pump for normally supplying a quantity of lubricant to the system which is in excess of the requirements, an actuating cylinder, means for conveying excess lubricant through the cylinder, a piston disposed within the cylinder for controlling the passage of excess lubricant therethrough, means for conveying the pressure of the lubricant to the cylinder for actuating the piston, and a valve disposed in said pressure conveying means for damping fluctuations in the pressure of the fluid acting upon the piston.

7. In a lubricating system, the combination of a main pump for delivering a quantity of lubricant to the system which is normally in excess of the demand, an auxiliary pump for supplementing the capacity of the main pump, a motive fluid admission valve for the auxiliary pump, a servo-motor for operating the admission valve, a pressure responsive mechanism for controlling the movement of the servo-motor and for controlling the overflow of excess fluid from the system, means for conveying the pressure of the lubricant in the system to the pressure responsive mechanism for actuating the same, and means provided in said pressure conveying means for damping fluctuations in the fluid pressure.

8. In a lubricating system, the combination of a main oil pump for delivering oil under pressure to the system, an auxiliary oil pump also for delivering oil to the system, a motive fluid admission valve for the auxiliary pump, a fluid pressure relay mechanism for controlling the admission valve, a source of operating fluid pressure for the relay mechanism, said relay mechanism including an operating piston for the admission valve and pilot valve means controlling the admission of fluid pressure from said source to the operating piston, and means responsive to oil pressure in the system for controlling the pilot valve means, said pilot valve means acting, in response to normal oil pressure in the system, to place that side of the operating piston, on which the fluid pressure acts in the direction for closing the admission valve, in communication with the source of fluid pressure to effect a tight closing of the admission valve.

9. In a lubricating system, the combination of a main oil pump for delivering oil under pressure to the system, an auxiliary oil pump also for delivering oil to the system, a motive fluid admission valve for the auxiliary pump, said admission valve being of the unbalanced type in which the motive fluid biases the valve in opening direction, a fluid pressure relay mechanism for controlling the admission valve, a source of operating fluid pressure for the relay mechanism, said relay mechanism including an operating piston for the admission valve and pilot valve means controlling the admission of fluid pressure from said source to the operating piston, and means responsive to oil pressure in the system for controlling the pilot valve means, said pilot valve means acting, in response to normal oil pressure in the system, to place that side of the operating piston, on which the fluid pressure acts in the direction for closing the admission valve, in communication with the source of fluid pressure to effect a tight closing of the admission valve.

In testimony whereof, I have hereunto subscribed my name this 29th day of April, 1925.

FRANCIS HODGKINSON.